US009495279B2

(12) United States Patent
Rabin

(10) Patent No.: US 9,495,279 B2
(45) Date of Patent: Nov. 15, 2016

(54) METHOD AND APPARATUS FOR EFFICIENT STATISTICAL PROFILING OF VIDEO GAME AND SIMULATION SOFTWARE

(75) Inventor: Steve Rabin, Bothell, WA (US)

(73) Assignee: NINTENDO CO., LTD., Kyoto (JP)

( * ) Notice: Subject to any disclaimer, the term of this patent is extended or adjusted under 35 U.S.C. 154(b) by 2133 days.

(21) Appl. No.: 12/533,845

(22) Filed: Jul. 31, 2009

(65) Prior Publication Data
US 2010/0083234 A1 Apr. 1, 2010

Related U.S. Application Data

(60) Provisional application No. 61/101,164, filed on Sep. 30, 2008.

(51) Int. Cl.
G06F 9/44 (2006.01)
G06F 11/36 (2006.01)
G06F 11/34 (2006.01)

(52) U.S. Cl.
CPC ........ G06F 11/3636 (2013.01); G06F 11/3466 (2013.01); G06F 2201/88 (2013.01)

(58) Field of Classification Search
None
See application file for complete search history.

(56) References Cited

U.S. PATENT DOCUMENTS

| 5,212,794 | A | * | 5/1993 | Pettis et al. .................. 717/153 |
| 5,355,487 | A | | 10/1994 | Keller et al. |
| 6,718,286 | B2 | | 4/2004 | Rivin et al. |
| 7,079,993 | B2 | * | 7/2006 | Stephenson et al. ............ 703/2 |
| 7,587,709 | B2 | * | 9/2009 | Chilimbi et al. ............. 717/130 |
| 7,730,460 | B1 | | 6/2010 | Warren et al. |
| 8,051,410 | B2 | * | 11/2011 | Marfatia et al. ............. 717/137 |
| 2003/0171907 | A1 | | 9/2003 | Gal-On et al. |
| 2005/0200627 | A1 | | 9/2005 | Desylva |
| 2006/0242636 | A1 | * | 10/2006 | Chilimbi et al. ............. 717/158 |
| 2007/0006173 | A1 | | 1/2007 | Sohm et al. |
| 2008/0120543 | A1 | | 5/2008 | Cahill et al. |
| 2008/0127149 | A1 | | 5/2008 | Kosche et al. |
| 2008/0170073 | A1 | | 7/2008 | Ono et al. |
| 2009/0147006 | A1 | | 6/2009 | Buck et al. |
| 2010/0079463 | A1 | | 4/2010 | Rabin |

OTHER PUBLICATIONS

Steve Rabin et al., Wii Profiler— 1_1-20071008, Wii Profiler v1.1—Sampling Profiler for Nintendo Wii, Oct. 8, 2007 (8 pages).
Steve Rabin et al., Wii Profiler—1_0-070423, Wii Profiler v1.0—Sampling Profiler for Nintendo Wii, Apr. 23, 2007 (6 pages).

(Continued)

Primary Examiner — Elias Mamo
(74) Attorney, Agent, or Firm — Nixon & Vanderhye P.C.

(57) ABSTRACT

Efficient statistical profiling in embedded computing devices, such as video games, uses a hybrid random distribution of sampling points for more accurate reconstruction of executing code. Transmission of only function start addresses and corresponding representation of the call graph data reduces the memory overhead and increases communication speed.

8 Claims, 5 Drawing Sheets

(56) References Cited

OTHER PUBLICATIONS

Steve Rabin et al., Wii Profiler—2_0-20080418, Wii Profiler v2.0—Sampling Profiler for Nintendo Wii, Apr. 18, 2008 (11 pages).
Stephen G. Eick et al., "Visualizing Code Profiling Line Oriented Statistics", AT&T Bell Laboratories, 1992, pp. 210-217.
Priya Nagpurkar et al., "Efficient Remote Profiling for Resource-Constrained Devices", ACM Transactions on Architecture and Code Optimization, vol. 3, No. 1, Mar. 2006, pp. 35-66.
Steve Rabin, Wii Profiler v2.0,Wii Summit 2008, Powerpoint slides, Apr. 11, 2008 (60 pages).
Office Action mailed Jul. 16, 2012 in U.S. Appl. No. 12/534,048.
Office Action mailed Nov. 16, 2012 in U.S. Appl. No. 12/534,048.
Justin Seyster, "Techniques for Visualizing Software Execution," Technical Report FSL-08-03, Stony Brook University, Mar. 6, 2008 (35 pages).

\* cited by examiner

- "Main"  0x1000 - 0x2000
- "Calculate Collisions"  0x3000 - 0x4000
- "Distance Test"  0x4000 - 0x5000

METHOD AND APPARATUS FOR EFFICIENT STATISTICAL PROFILING OF VIDEO GAME AND SIMULATION SOFTWARE

CROSS-REFERENCE TO RELATED APPLICATIONS

This application claims priority to U.S. Application 61/101,164, filed Sep. 30, 2008, the entire contents of which are incorporated herein by reference. Moreover, the disclosure herein may relate at least in part to U.S. provisional patent application 61/170,509 entitled "METHOD AND APPARATUS FOR VISUALIZING AND INTERACTIVELY MANIPULATING PROFILE DATA" filed Apr. 17, 2009, which is incorporated herein by reference in its entirety.

FIELD OF TECHNOLOGY

The technology herein relates to software monitoring and testing, and more particularly to efficient statistical software profiling in embedded computing devices, including but not limited to video games. Still more particularly, the technology herein relates to use of display-based timing to provide statistically accurate indications of software and system behavior.

BACKGROUND AND SUMMARY

Generally speaking, a profiler is a tool which aids in analyzing the dynamic behavior of a computer program e.g., for optimizing its performance or finding bugs or other problems. Profiler results can be used to identify inefficient sections of the program, which can then be modified to operate faster or more optimally.

Common profiler technologies include instrumenting and statistical analysis. The instrumenting approach, generally speaking, alters the computer program (or "instruments" it) with additional instructions that report back or log each time each function of interest is entered and exited. Log data from the instrumented commands is collected when the program is run. The log data can be used to reconstruct the program flow and examine how much time was spent in each function. Instrumenting can sometimes alter the program's dynamic operation or slow it down because of the extra code that is inserted. In a video game context, the delay for heavy instrumentation can sometimes be large enough to cause video games to become unplayable or no longer representative of actual dynamic game play.

A statistical profiler does not necessarily significantly alter the computer program. Instead, it may periodically stop the program execution (e.g., based on a timer) to sample where the program is in its execution at that particular instant. By sampling thousands or millions of times, a statistically accurate view of the program execution can be reconstructed.

Traditionally, many or most statistical profilers have been designed as general purpose tools for profiling and analyzing a wide variety of programs. Often, the specific nature of the program being profiled has not in the past been exploited in choosing any particular profiler sampling method. However, depending on the particular program being analyzed, purely deterministic sampling times, where each sample occurs at a fixed interval, may result in some areas of the code being oversampled and other areas being undersampled. This can happen when such samples are not necessarily statistically well distributed. On the other hand, statistical profiling with purely random distribution for the sampling points can in some contexts tend to group or cluster samples together, resulting in poor reconstruction.

Therefore, there is a need for an efficient method for choosing the sampling points during statistical profiling, based on the nature of the program being profiled.

In real-time video games and other real-time simulations, the video screen is typically refreshed at periodic rates at or above 30 times per second. This visual update frequency often dictates or at least informs the rate at which the simulation is recalculated and updated to provide new positions and animation points for the simulation display. As a result, similar processing takes place from one simulation frame to the next, such that the work done during each frame is roughly correlated to previous and subsequent frames. For example, during each frame, simulation entities may run their decision logic, movement logic, collision logic and other functions. This coherency from frame to frame causes similar code to be executed each simulation frame (e.g., every time through the simulation loop).

The exemplary illustrative non-limiting implementation herein uses the periodic nature of the video game frame refresh rate to provide improved statistical sampling of the executing code. This technique can compensate for the fact that similar code executes during each iteration through the simulation loop. However, instead of sampling at the same time each frame the sampling points may be deterministically or otherwise specified at points that differ from one frame to the next.

One exemplary illustrative non-limiting method and apparatus for efficient statistical profiling of an executing code in an embedded computing device chooses sample points based on characteristic properties of real-time video games and real-time simulation programs. A hybrid random distribution of sampling points can be used, wherein the sampling rate is fixed but is for example randomly or otherwise offset relative to the beginning of each simulation time frame. As a result of such sampling distribution, accurate measurements and comparisons can be deduced from fewer samples. Such samples can have good statistical coverage and provide a good representation of the underlying behavior being sampled.

Additionally, profiling an executing code in an embedded device, such as a video game console can confront system constraints such as limited on-board memory and relatively slow upload speed to a PC (personal computer) or other device. A statistical profiler may generate an extremely large amount of data in the embedded device relative to the available memory. Therefore, it is desirable to efficiently store the accumulated data, since otherwise it may not necessarily be streamed to a connected PC or other device quickly enough without impacting overall system performance. Once profiling has been completed, an efficient representation of the created data is desirable, so that the collected data can then be transferred to a PC or other device in a reasonable amount of time. Transferring collected raw data might take a considerably longer time to transfer. The disclosed exemplary illustrative non-limiting statistical profiler accomplishes these and other goals, resulting in operation fast enough so that the game can be played while the profiling is being performed in real time.

In one exemplary illustrative non-limiting embodiment, a list of function addresses required for the profiling process is provided to or generated by the embedded device before profiling begins. The list does not necessarily contain all of the function addresses and their sizes, but may for example contain only the function start addresses. In this way, a desired decrease in storing information is achieved. In one exemplary implementation, the call stack data that is created by the statistical sampling profiler can be transformed to contain only start addresses. This allows sample data to be sorted and accumulated on-the-fly—dramatically reducing the amount of stored data. Such exemplary efficient representation of statistical profiling samples can alleviate problems that can occur when profiling in an embedded device that lacks sufficient memory and/or adequate communication speed. The disclosed exemplary illustrative non-limiting technique of efficiently extracting and representing function addresses provides the ability to store thousands or millions of samples using magnitudes of less memory compared to storing raw data—also leading to faster transmission times to a connected PC or other analysis device.

Additional non-exhaustive exemplary non-limiting features include for example:

- A statistical sampling profiler that takes the repetitive nature of the executing program code being profiled into account when choosing the timing and spacing of the samples.
- A sampling algorithm that waits a random amount of time from the beginning of each simulation frame to begin sampling and then samples at regular intervals until the completion of the frame, at which time the sampling ceases until a next or subsequent frame.
- A sampling algorithm that ensures the random amount of time to wait from the beginning of a frame is significantly different from previous frames, so that samples between an arbitrary number of consecutive frames are well distributed with respect to one another.
- A statistical sampling profiler that sends a list of the starting addresses of functions to the embedded device on which profiling will be performed.
- During profiling on the embedded device, each sample call stack that is recorded is transformed so that each address represents the starting address of the function that was sampled.
- Each address transformation is accomplished by performing a binary search on the list of starting addresses, finding a match in log N time complexity. Other comparable methods such as a hash table could also be employed.
- Given each transformed sample call stack, a binary tree known as a "first child-next sibling" is used to store the data. This efficiently packs the data into an array that grows as more samples are added. This represents the tree structure of the call graph.
- A parallel array stores the frequency counts of each node in the "first child-next sibling" call graph tree. This separation from the call graph binary tree makes both data structures more cache and memory friendly, since this frequency count array is updated more frequently than the call graph binary tree.
- To retain individual samples, an additional step is to save a pointer to the leaf node function in the call graph tree for each sample taken. Coupled with the call graph, this reduces each profile sample down to a single pointer, as opposed to the individual addresses of the entire call stack.
- If memory allows, the raw profiling data can be stored as it is collected and then transformed at the conclusion of profiling to reduce its memory size.
- When profiling is complete, the call graph tree and either the frequency count array or the sample pointers are transmitted to the PC from the embedded device, thus achieving greater speed than transmitting the original raw sample data.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Figure 1:
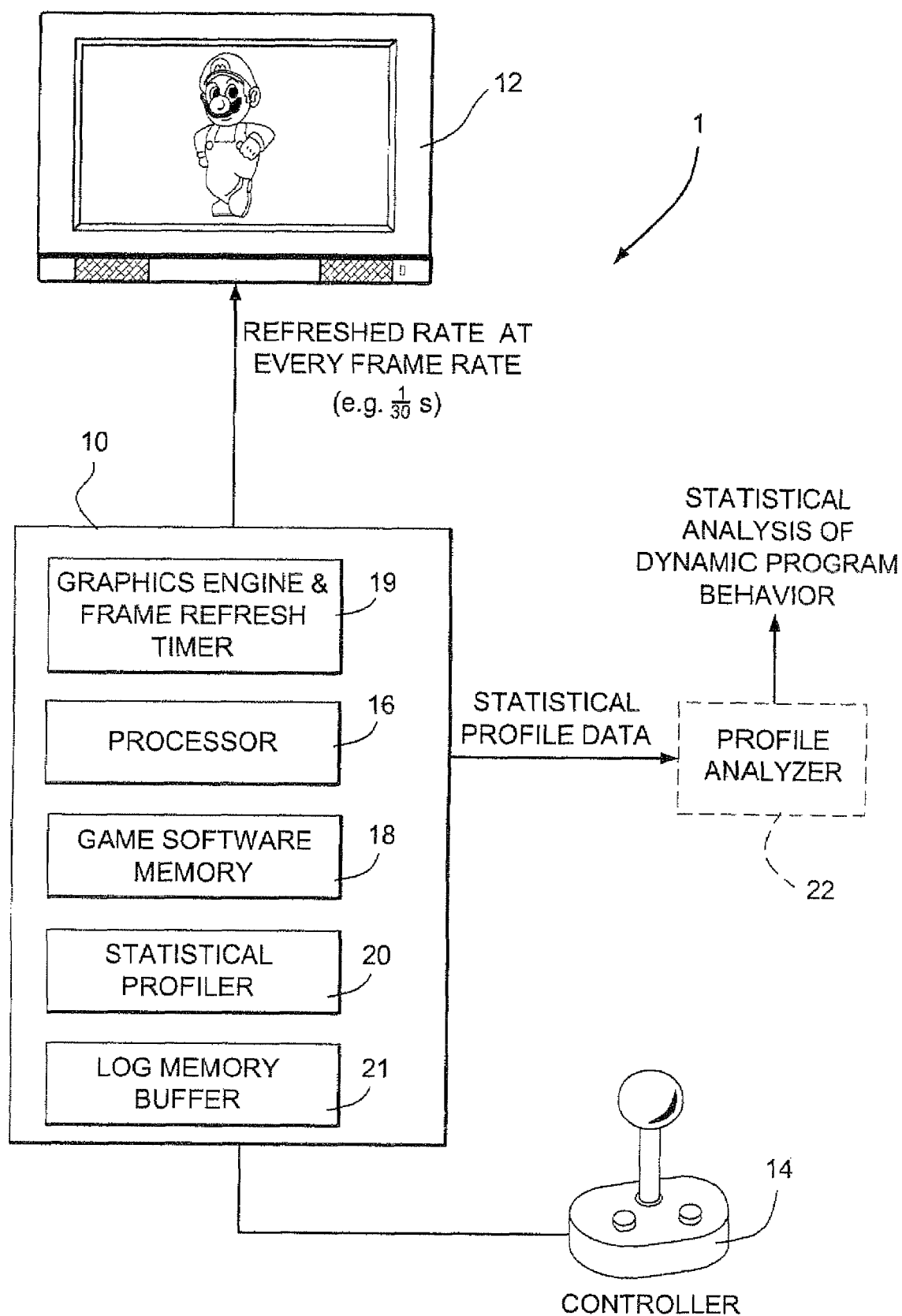
FIG. 1 is a schematic block diagram showing an exemplary illustrative non-limiting implementation of a statistical profiling system in an embedded computing device.

FIG. 1 shows in block diagram form an exemplary illustrative non-limiting software development system for an embedded computing device such a video game system. The software development system 1 comprises a computing system 10 that is connected to a display 12 and a hand-held controller 14. The computing system 10 includes a computer processor unit 16, which stores and executes a software program, for example, game software 18. System 10 may further include a 3D graphics engine 19 that generates graphics for display on display 12. Such a graphics engine 19 may include for example a frame buffer memory that composes an image periodically (e.g., every $\frac{1}{30}^{th}$ or $\frac{1}{60}^{th}$ of a second) and reads out the image for display on display 17. The frame refresh rate may be controlled by a frame refresh timer that interrupts the processor 16 at the periodic or non-periodic frame rate. Such a system could comprise for example the Wii or the Nintendo DS sold by Nintendo of America.

The computing system 10 further includes software or hardware that may be used to monitor the sequence of operations the processor 16 performs while executing the game program 18. In one exemplary illustrative non-limiting implementation, such monitoring may comprise a statistical profiler software, which non-intrusively samples the processor's program execution and at a rate and at timings that are responsive to the frame refresh rate (as will be further explained below). The statistical profiler 20 produces statistical profiling data, which may specify for example the various functions that were called during the execution of the program, and their corresponding addresses, which in turn indicate where in memory the program instructions are stored, as well as the number of times particular functions were called. The profiler 20 may store such collected data in a log memory buffer 21. A profile analyzer unit 22 receives the statistical profile data from log memory 21 and conducts an analysis of the dynamic program behavior based on the statistical sample of the program code being executed so that a software developer may identify which routines are consuming the majority of the processor's utilization time, and subsequently optimize the structure of such routines.

Figure 2:
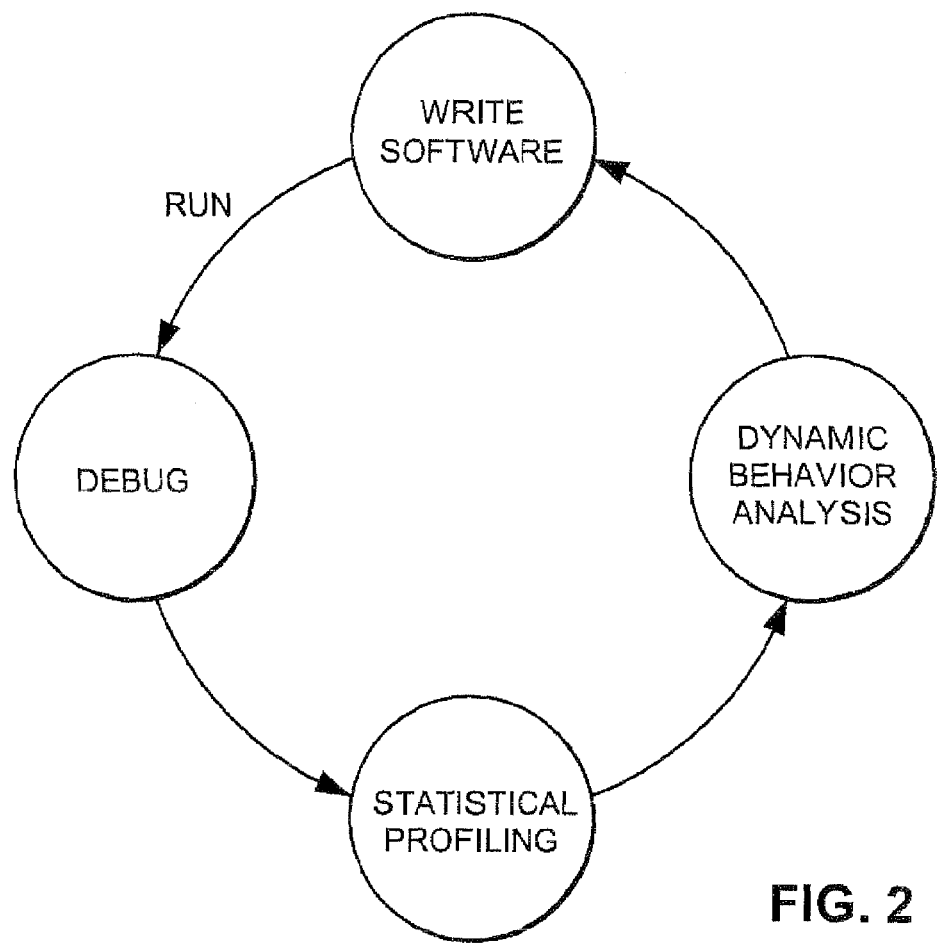
FIG. 2 is a schematic diagram showing a sequence of steps for analyzing a computer software program according to an exemplary illustrative non-limiting implementation.

FIG. 2 depicts a sequence of steps in the process of developing software using such statistical profiler analysis. A software developer writes a program, which is executed in a computer processor. In order to look for errors in the software program (an activity referred to as "debugging") or for other purposes, the execution of the software code is effected using statistical profiling. The results of the statistical profiling offer a picture of the dynamic behavior of the program during its execution. Based on this analysis, the developer is in better position to change the original software code so that its dynamic operation is optimized. This process can be performed iteratively as shown.

A. Efficient Statistical Profiling By Varying the Distribution of the Samples within a Frame Typically, a media processing system, such as a video game console or a real-time simulation system may form an image or picture on a display by generating the display one line or frame at a time. For example, in a raster scan display, the instantaneous brightness at a particular physical point on the display is represented by the amplitude of the electrical signal. The scanning circuit retraces to the left edge of the display and then starts scanning the next line. Starting at the top of the display, all of the lines on the display are scanned in this way. One complete set of lines makes a picture of image. This is referred to as a frame. Once the first complete picture is scanned, the scanning circuit retraces to the top of the display and starts scanning the next frame. In case of video signals, this process is repeated so fast that the human eye blends the succeeding frames together and displayed images are perceived to have a continuous motion.

The media processing system may display the media information in several display or scan modes. Examples of scan modes include interlaced and non-interlaced (progressive) modes. Such modes are related to different scanning techniques. Television signals and compatible displays are typically interlaced, and computer signals and compatible displays are typically non-interlaced.

In interlaced scanning, a frame representing a picture is split into two separate fields. One field may include odd lines of the picture and the other field may include even lines of the picture. The two fields constitute a frame. A picture formed by interlaced scanning is drawn on the screen in two passes, first by scanning the horizontal lines in the first field, and then scanning (or interlacing) the horizontal lines in the second field in-between the first set of lines. Interlacing field 1 and field 2 at 60 fields per second yields an effective 30 frames per second frame rate.

In non-interlaced scanning, the picture is formed on the display by scanning all of the horizontal lines of the picture in one pass from the top to the bottom. This is sometimes referred to as "progressive scanning'. Unlike interlaced scanning, progressive scanning involves complete frames including both odd and even lines, in other words, each scan displays an entire frame. For example, in progressive scanning, a frame rate of 60 frames per second causes 60 frames to be formed on the display, in contrast to interlaced scanning, where a field rate of 60 fields per second causes only 30 frames per second to form on the display.

Figure 3:
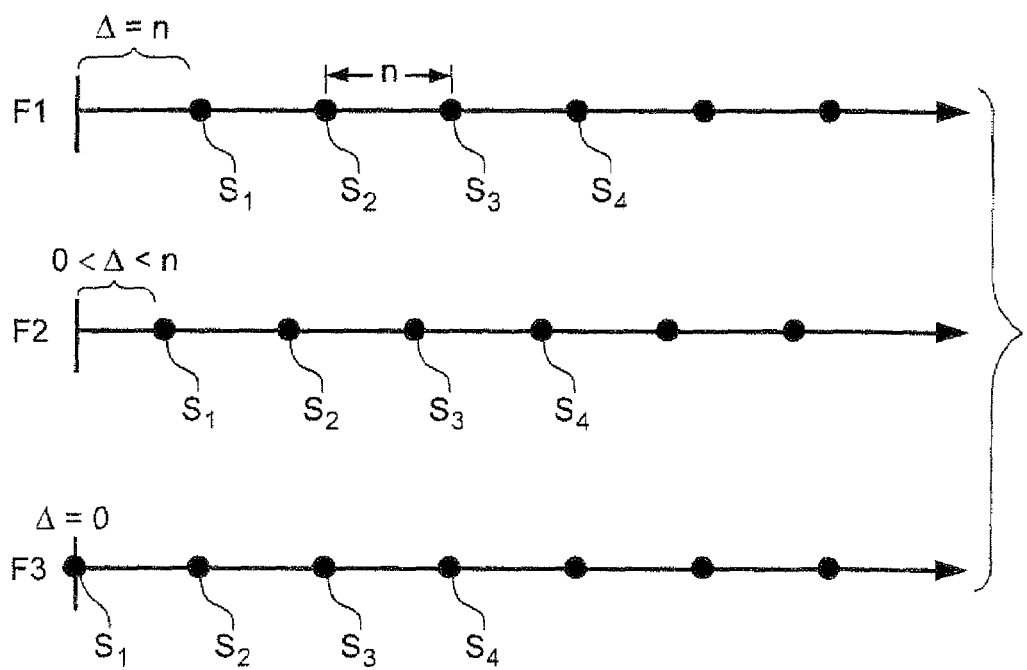
FIG. 3 is a schematic showing an exemplary non-limiting sequence of frames with corresponding sampling distributions.

Whatever the frame rate is, the exemplary illustrative non-limiting implementation described herein generates well spaced samples that vary from frame to frame. In order to achieve this, the exemplary illustrative non-limiting implementation uses a hybrid random sample distribution, wherein a fixed sampling rate is used, but the first sampling point in each frame has a random offset from the beginning of the frame. FIG. 3 depicts such a sampling method. Three successive exemplary frames F1, F2 and F3 are shown. Sampling occurs during times $S_1, S_2, S_3 \ldots S_N$. The number N of sampling points can be any number such as thousands, or millions. The interval between the sampling points may be constant. The number of samples per frame may be different, but the spacing between the samples can be the same. In one exemplary illustrative non-limiting implementation, the first sampling point $S_1$ of a particular frame is taken $\Delta$ sec after the beginning of the frame, where $\Delta$ is a random number. The random offset is in the range of $[0, n]$, where n is the time between fixed samples. For example, if the fixed sampling rate is 1,000 times per second, then the time between samples is 0.001 seconds. Therefore, in this example, the random offset is in the range [0, 0.001]. In FIG. 3, the offset is the largest in the top frame F1, the lowest in the bottom frame F3, and somewhere in between in frame F2.

The exemplary illustrative fixed sampling rate ensures that samples within a frame are well distributed. In addition, significant variation in the random offsets from frame to frame results in a good sampling distribution from frame to frame. In one exemplary illustrative non-limiting implementation, to ensure great variation of the sampling distribution from frame to frame, the range for the offset is varied for each frame, and it may be based on the ranges used in previous frames. In other words, the goal is to generate random numbers for each offset based on ranges that do not lie too close to previous values. For example, if the whole range of possible offsets is [0, 1], and the last two frame offsets were 0.13 and 0.96, then the range for the next offset might be [0.23, 0.86]. This exemplary implementation satisfies the requirement that consecutive offsets cause the sampling to vary significantly from frame to frame. Non-random variable offsets could be used if desired, or various techniques could be used for determining different offsets for different frames to provide representative sample times.

The above exemplary illustrative hybrid random sampling rate allows for samples within an individual frame or a small group of frames to be analyzed with a high degree of confidence, because they represent a statistically accurate view of the true program behavior.

B. Efficient Statistical Profiling by Efficiently Representing the Form of the Samples Statistical profiling may generate a great amount of data due to the sampling of the executing code. This represents a challenge to efficiently storing the accumulated data. The exemplary illustrative non-limiting technology herein addresses this challenge by effectively manipulating two aspects of the profile data: the individual samples, both cumulatively and individually, and a resulting call graph structure of the program being profiled.

Figures 4, 5:
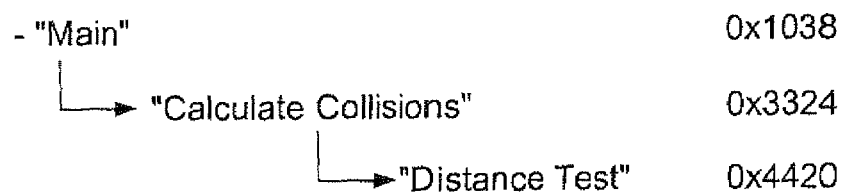
FIG. 4 shows an exemplary illustrative non-limiting call stack recorded at one exemplary instant of the program during recording/execution.
FIG. 5 shows an exemplary illustrative non-limiting example of exemplary ranges of various functions recorded in a call stack.

First, the treatment of a single profile sample in a statistical sampling profiler is examined. When a statistical sampling profiler takes a sample, it temporarily interrupts the program execution and records the call stack. This stack comprises a series of addresses, which represent positions within various functions running during the execution of the program. For example, as shown in FIG. 4, the call stack may contain the functions: "Main", "CalculateCollisions", and "DistanceTest" with the respective addresses: "0x1038", "0x3324", and "0x4420". This indicates that the function "Main" called the function "CalculateCollisions", which in turn called the function "DistanceTest". The composition of the call stack further indicates that the program execution was ultimately stopped/sampled inside the function "DistanceTest". The corresponding addresses indicate where in memory the program instructions are stored for the currently executing instructions at each moment and for each function level.

Generally, each function is composed of many individual instructions (i.e., steps that produce the desired result at the end), with all the instructions in a function stored at sequential series of addresses in the memory. For example, as shown in FIG. 5, the function "DistanceTest" has its first instruction located at the 0x4000 address, and its last instruction before 0x5000, with corresponding range of addresses for the other functions. When the exemplary illustrative profiler captured a sample in the above example, the current execution at that point was in the middle of the function "DistanceTest", namely at the 0x4420 address. For the profiler to determine which function contains the instruction address 0x4420, it consults the list of all function start addresses and function sizes. This list can be generated by the compiler when the program is compiled. However, for an embedded device, the list of function addresses and sizes is often large in terms of memory, and may reside on the PC side (where the program was compiled). Thus it may be transmitted to the embedded device before the profiling process may begin.

An exemplary illustrative non-limiting implementation involves transmitting the list of function addresses to the embedded device before profiling begins. Moreover, to promote efficiency, only the function start addresses need to be sent. Not all function addresses are necessarily sent to the embedded device nor their sizes (since the size of each function can be inferred from this truncated data). Given an arbitrary address inside a function, and using only the list of function start addresses, it is possible to find the start address of a function for an arbitrary address by performing a binary search on the list. For example, if the function start addresses were (0x1000, 0x2000, 0x3000, 0x4000, 0x5000, 0x6000) and the arbitrary address in the sample was 0x4420, then a binary search would find the corresponding start address 0x4000 in two steps, or generally in log N steps, where N is the number of addresses in the list. Other comparable methods such as a hash table could also be used.

Figure 7B:
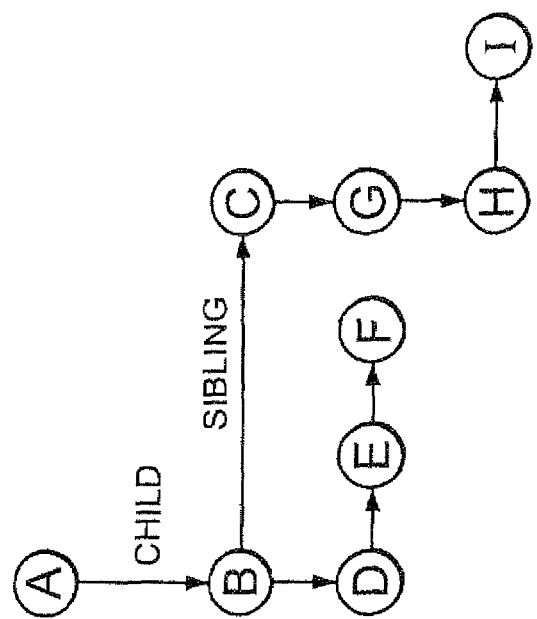
FIGS. 7A and 7B show exemplary illustrative binary trees.
Figure 7A:
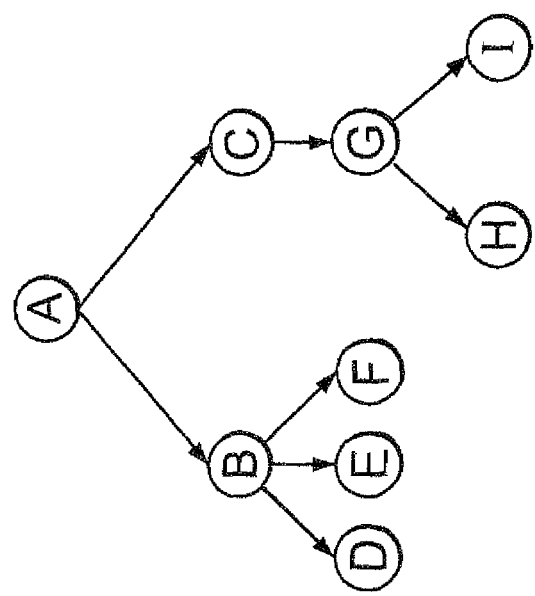

Typically, in a statistical sampling profiler, the call stack data is simply collected and stored without any additional processing. In the case where the embedded device has only a small amount of memory available, there may be a strict memory requirement for storing the profile data. The solution is to process each address taken during the profiling to discover the true start address of the function that contains the address. If the sampled data is transformed to only contain start addresses, then the sample data can be sorted and accumulated while at the same time the amount of stored data can be drastically reduced. For example, if 1,000,000 samples are taken with an average call stack depth (i.e., number of addresses) of 14, then profiling in a traditional profiling system, there are 14,000,000 addresses to store. However, if each function address is transformed into its start address, then the addresses can be sorted and accumulated in a tree form. See FIGS. 7A and 7B for exemplary binary call graph trees. If the call graph tree contains 1,000 functions, each with a corresponding start address, then there are only 1,000 addresses with 1,000 corresponding function counts (representing how many times that function is the tree was sampled), and 2,000 internal tree pointers, resulting in approximately 4,000 stored data items. Comparing this number to the total number of data items stored in a traditional profiler (and assuming that all addresses, counts and pointers are individually the same size in bytes), it is seen that the exemplary illustrative non-limiting data structure implementation is 3,500 times smaller than the raw data.

To further illustrate how the transformation technique may affect the call graph resulting from the samples taken during the profiling, the following example is given, where five raw profile samples are taken during the profiling process:

| Sample 1: | 0x1038, | 0x3234, | 0x4420 |
| Sample 2: | 0x1038, | 0x3234, | 0x4868 |
| Sample 3: | 0x1038, | 0x3438 | |
| Sample 4: | 0x1330, | 0x2874, | 0x5920 |
| Sample 5: | 0x1574, | 0x4760 | |

After determining the start address for each address, the profile samples become:

| Sample 1: | 0x1000, | 0x3000, | 0x4000 |
| Sample 2: | 0x1000, | 0x3000, | 0x4000 |
| Sample 3: | 0x1000, | 0x3000 | |
| Sample 4: | 0x1000, | 0x2000, | 0x5000 |
| Sample 5: | 0x1000, | 0x4000 | |

This data can be compactly represented in the following tree form:

```
0x1000, count 0
|
-0x3000, count 1
| |
| -0x4000,   count 2
|
-0x2000, count 0
| |
| -0x5000,   count 1
|
-0x4000, count 1
```

The count number at each node can be incremented each time the function was called, corresponding to the number of samples recording the call of that function. For example, during the time interval corresponding to five samples given above, the sequence of functions having corresponding starting addresses 0x1000, 0x3000, 0x4000 was called twice.

In a "first child-next sibling" binary tree form, where each node may have two links, one leading to a "first child" node and one leading to a "next sibling" node, which is the next node at the same level, the tree would have the following representation (X denotes a NULL value):

| Index 0: | (0x1000, | First Child = 1, | Next Sibling = X) |
| Index 1: | (0x3000, | First Child = 2, | Next Sibling = 3) |
| Index 2: | (0x4000, | First Child = X, | Next Sibling = X) |
| Index 3: | (0x2000, | First Child = 4, | Next Sibling = 5) |
| Index 4: | (0x5000, | First Child = X, | Next Sibling = X) |
| Index 5: | (0x4000, | First Child = X, | Next Sibling = X) |

The above can be stored as an array of triples:
[(0x1000,1,X), (0x3000,2,3), (0x4000,X,X), (0x2000,4,5), (0x5000,X,X), (0x4000,X,X)]

The frequency count data is stored as a horizontal array, with each index correlated to the same index in the binary tree:

[0, 1, 2, 0, 1, 1]

Figure 6:
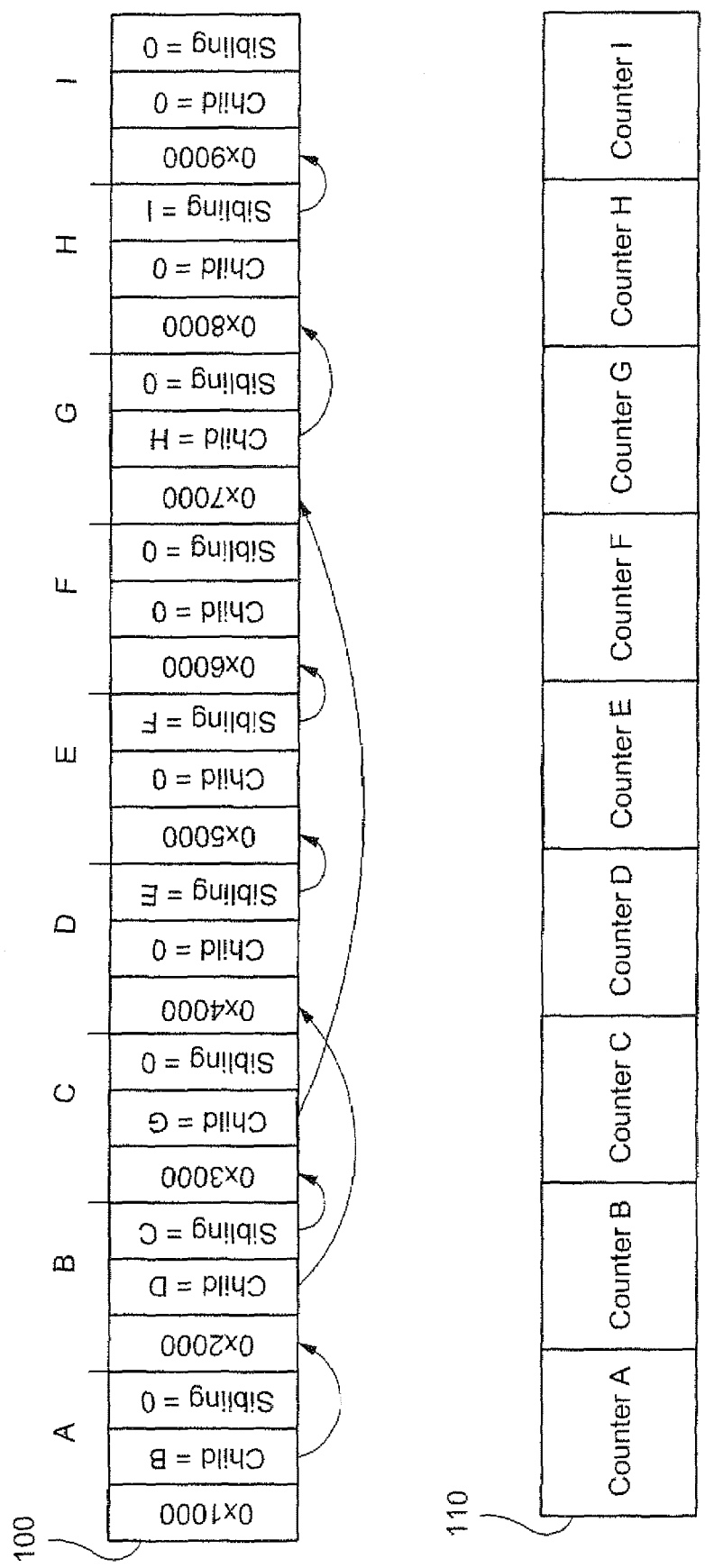
FIG. 6 is a schematic showing an exemplary non-limiting sequence of frames corresponding to a sequence of nodes in a "first child-next sibling" binary tree.

The above process can be described in reference to FIG. 6, wherein in the top portion 100, frames "A', "B", "C", etc. depict a sequence of nodes in the tree, i.e., starting addresses of functions, e.g., 0x1000, 0x2000, etc. Each frame corresponding to a function also includes a sub-frame corresponding to the "child" node and possibly a "next sibling" node resulting from the specific node. Based on the sequence of the various functions called by the program, a parallel frequency counter array 110 is provided that records the number of times each specific function in the top list is called.

In the exemplary illustrative non-limiting implementation, the call graph tree is typically built up relatively quickly with a small amount of sample data, whereas the frequency count array is continuously updated with each sample. Therefore, it may be advantageous and more cache and memory efficient to store the accumulated frequency count array separately from the call graph tree.

One consequence of accumulating profile samples into a call graph tree, is that individual frames (samples during a particular simulation loop) are lost as they are collapsed into the data over all the frames. Another implementation of this technique, at the cost of additional memory, preserves the individual sample data by storing only a pointer to the leaf node in the call graph tree for each sample. Only the leaf is needed, since the parents (or calling functions) are explicitly represented in the tree. In this way, additional memory of recording an entire call stack for each sample can be avoided.

For example, if 1,000,000 samples are taken with an average stack depth of 14, the traditional implementation would store 14,000,000 addresses. If each sample taken augments the call graph tree, then as discussed in the earlier example, it would result in 3,000 stored data items (i.e., 1,000 function addresses and 2,000 tree pointers). In addition, if each sample was recorded with a pointer to some node in the call graph tree, then there would be an 1,000,000 pointers. If we assume that each stored item is 4 bytes long, then at least some traditional methods store 56,000,000 bytes as compared to the exemplary illustrative non-limiting call graph implementation with pointers, which stores 4,012,000 bytes, 14 times smaller.

Given the previous example of profile samples and a corresponding call graph tree, the five stored samples (converted to pointers that refer to the indices of the call graph binary tree) would have the following representation:

Sample 1: 2
Sample 2: 2
Sample 3: 1
Sample 4: 4
Sample 5: 5

As an array of samples, it would appear as:
[2, 2, 1, 4, 5]

If the embedded device has enough memory to record all raw profile samples, the disclosed method could be applied as a post-process, for making the data still more efficient to transmit from the embedded device to the connected PC.

Efficient representation of statistical profile samples is highly desirable when profiling on an embedded device, which lacks sufficient memory and/or adequate communication speed with a connected PC. By efficiently representing the raw sample data and the corresponding call graph data structure, millions of samples can be stored using magnitudes of less memory compared to traditional statistical profiling systems. Either technique of utilizing the frequency count array or the storing individual samples pointing back to the call graph reduces the memory overhead, facilitates the storage capability of the device and increases the communication times with a connected PC.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

The invention claimed is:

1. A computing system for monitoring and testing executing software of the type that generates moving image frames on a display device at a predetermined refresh rate, the computing system comprising;
    a computer processor that executes code to provide a display on said display device; wherein
    the computer processor is configured to further perform statistical sampling of the code being executed to provide profiling data, wherein at least the first sampling point in each frame has a random temporal offset relative to the refresh rate; and
    based on the profiling data from the statistical sampling, provide information about the dynamic operation of the executing code.

2. The computing system of claim 1, wherein
    for each frame, the corresponding random offset has a range of [0, n], wherein n is the time between sampling points in the frame.

3. The computing system of claim 2, wherein
    the range for the random tempered offset is chosen based on the offset values of neighboring previous frames, so that the sampling distribution varies significantly from frame to frame.

4. The computing system of claim 1, wherein
    the code provides real-time video game play or a real-time simulation.

5. A computer implemented method for monitoring and testing software, being executed by a computing device that provides display information to a display device at a predetermined periodic frame rate, said computer implemented method comprising;
    statistically sampling, via one or more computer processing devices, the computer code being executed, beginning at a sampling point having a random temporal offset relative to said frame rate to provide profiling data; and
    analyzing, via one or more computer processing devices, the profiling data from the sampling to provide information about the computer software.

6. The computer implemented method of claim 5, wherein
    each of the frames has a different range for its corresponding random offset value, with the biggest range being [0, n], wherein n is the time between sampling points in a frame.

7. The computer implemented method of claim 6, wherein
    the range for the random offset of a frame is chosen based on the offset values of neighboring previous frames, so that the sampling distribution varies significantly from frame to frame.

8. The computer implemented method of claim 5, wherein
    the computing device is a video game console.

* * * * *